United States Patent [19]
Tsutsumi

[11] 3,766,403
[45] Oct. 16, 1973

[54] APPARATUS FOR ENSURING DC POWER SUPPLY FROM EITHER AC OR RECHARGEABLE DC SOURCE

[75] Inventor: Takashi Tsutsumi, Takatsuki, Japan

[73] Assignee: Matsushita Electric Industrial Co., Ltd., Osaka, Japan

[22] Filed: May 23, 1971

[21] Appl. No.: 255,980

[30] Foreign Application Priority Data
May 26, 1971  Japan................................ 46/36541

[52] U.S. Cl........................ 307/66, 320/9, 320/14
[51] Int. Cl. .............................................. H02j 7/00
[58] Field of Search .................. 307/64, 66; 320/5, 320/9, 14, 21

[56] References Cited
UNITED STATES PATENTS
3,339,081   8/1967   Borden et al. ....................... 307/66
3,573,483   4/1971   White ................................... 307/66

Primary Examiner—Gerald Goldberg
Attorney—Richard K. Stevens et al.

[57] ABSTRACT

A power supply apparatus for supplying DC power to an electric appliance such as a radio receiver, a television receiver and the like is adapted to be connected selectively to an AC power source or a rechargeable battery for producing DC power, the connection being changeable manually and also automatically when the AC power is interrupted.

5 Claims, 4 Drawing Figures

APPARATUS FOR ENSURING DC POWER SUPPLY FROM EITHER AC OR RECHARGEABLE DC SOURCE

This invention relates to a power supply apparatus and more particularly, to a power supply apparatus for use with electric appliances such as radio receivers.

Hitherto, radio receivers and the like have been arranged to receive electric power only from an external AC power source of commercial frequency or an internal DC power source such as primary or secondary batteries. Recently, there has been commercialized a so-called AC-DC radio receiver to which both the external AC power source and the internal DC power source are applicable selectively. However, if a user desires to change the power source from one to another, he must manually operate a switch and/or connect the power cord of the radio receiver to or disconnect the same from an outlet of the AC power source. Such operation will be somewhat troublesome for users. Further, a radio receiver equipped with a rechargeable secondary battery has another problem in that the secondary battery is often over charged or over-discharged. In view of the life of a battery, over-charge and over-discharge are very undesirable and especially the life is greatly reduced by over-charge. In order to protect the battery from being over-charged or over-discharged carelessly, it has been required to provide a device for protecting the battery from being over-charged or over-discharged.

For this purpose, various types of protection devices have been proposed and some of them are practically utilized. These protection devices are usually arranged such that the battery voltage exceeding an upper limit or reducing below a lower limit thereof is detected by a modified schmitt circuit which is selectively connected to a signal corresponding to the upper limit or another signal corresponding to the lower limit.

For the practical purposes, however, it is desirable to inform users of the state that the battery voltage, once exceeded the upper limit or reduced below the lower limit, has been recovered within an allowable range by monitoring the battery voltage. In the case of lead batteries, for example, the electrolyte is decomposed by a current therethrough when the battery is over-charged, while the electro-chemical reaction progresses excessively when over-discharged whereby, in any event, the electrodes will be damaged. Therefore, it is necessary to determine the upper limit of the battery voltage at a relatively lower value and the lower limit thereof at a relatively higher value as the ambient temperature increases, in order to protect the battery from damage due to over-charge or over-discharge. The present invention has been developed from our study of the problems as above-mentioned.

An object of the present invention is to provide a power supply apparatus for supplying a load with electric power selectively from an external AC power source of commercial frequency or an internal DC power source such as batteries, wherein the selection of the power sources is automatically carried out under a predetermined condition thereby saving users from troublesome operations.

Another object of the present invention is to provide a power supply system with a secondary battery internally equipped in which the secondary battery is automatically charged thereby saving users from maintenance thereof.

A further object of the present invention is to provide a power supply apparatus as abovementioned which includes a detecting circuit for protecting the battery from being over-charged or over-discharged thereby protecting the battery from damage, ensuring longer life of the battery and increasing reliability of the apparatus.

Above and other objects, features and advantages of the present invention will be clear from the following description in conjunction with the accompanying drawings in which.

Figure 1:
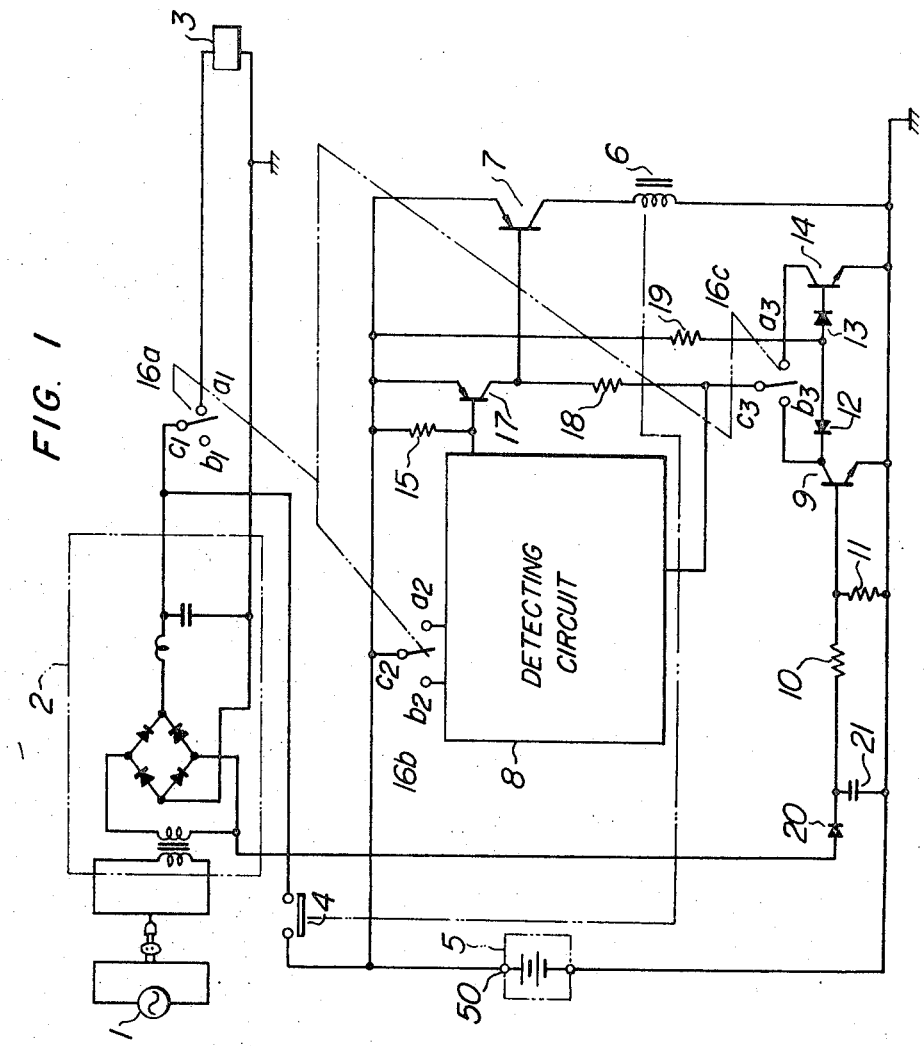
FIG. 1 shows a circuit diagram of an embodiment of a power supply apparatus according to the present invention.

Referring to FIG. 1, reference numeral 1 is an AC power source, 2 an AC-DC convertor, 3 a load connected in series with the AC-DC convertor 2, 4 a relay switch comprising a pair of spaced contacts and an armature for bridging said contacts connected to an output of the AC-DC convertor 2, 5 a rechargeable battery of which one electrode is connected to the relay switch 4 through a DC input terminal 50, 6 a relay coil for actuating the armature of said relay switch 4, 7 a transistor for controlling the energization of the relay coil 6, 8 a detecting circuit for the detection of over-charge and over-discharge of the battery 5 as described in more detail hereunder, 9 a transistor for detecting the presence of an AC voltage, 20 a diode for rectifying an AC current, 21 a smoothing capacitor, 10 and 11 resistors each having one terminal connected to the base of the transistor 9, 12 and 13 diodes, 14 a transistor, 15 a resistor which is connected at one end to the detecting circuit 8 and at the other end to the one electrode of the battery 5, 16a a switch for connecting an output of the power supply apparatus to the load 3, 16b a switch for changing the connection between the detecting circuit and an input thereto, 16c a switch connected selectively to the transistors 9 or 14, the switches 16a, 16b, and 16c being interlinked by a suitable means so as to be actuated simultaneously, 17 a transistor which is rendered conductive with the operation of the detecting circuit 8, and 18 and 19 resistors.

Now description will be made of operation of the circuit arranged as abovementioned. The input terminals of the AC-DC convertor 2 are connected to an external AC power source 1 by a suitable power cord. Assuming that the switches 16a, 16b and 16c are positioned to connect contacts $C_1$, $C_2$ and $C_3$ to contacts $a_1$, $a_2$ and $a_3$, respectively, the load 3 is supplied DC power from the external AC power source through the AC-DC convertor 2, while the base of the transistor 9 is supplied a base current from the AC power source through a transformer of the AC-DC convertor 2, a circuit consisting of the diode 20 and the capacitor 21 by which the current from the transformer is rectified and smoothed, and the resistor 10. As a result, the transistor 9 becomes conductive thereby short-circuiting the base and the emitter of the transistor 14. Then, a current flows through a circuit of the battery 5, the resistor 19, the diode 12 and the transistor 9, but no current flows through a circuit of the battery 5, the resistor 19, the diode 13 and the transistor 14 and also a circuit of the battery 5, the transistor 17, the resistor 18, the contacts $C_3$ and $a_3$ and the transistor 14. Hence, the transistor 7 is nonconductive and the relay coil 6 is deenergized, thereby turning off the relay switch 4. Under this condition, therefore, the AC power from the external AC power source is consumed substantially only for energizing the load 3.

Next, assuming that the switches 16a, 16b and 16c are positioned to connect the contacts $C_1$, $C_2$ and $C_3$ to the contacts $b_1$, $b_2$ and $b_3$, respectively, while receiving AC power at the input terminals of the deivce, no electric power is supplied to the load 3, while the transistor 9 is rendered conductive by a base current supplied from the AC power source through the transformer of the AC-DC convertor 2, the rectifying and smoothing circuit of the diode 20 and the capacitor 21, and the resistor 10 and hence, the transistor 9 permits a current to flow from the battery 5 through the emitter-base circuit of the transistor 7, the resistor 18 and the contacts $c_3$ and $b_3$. As a result of the emitter-base current, the transistor 7 is rendered conductive thereby energizing the relay coil 6 by a DC current from the battery 5, turning on the relay switch 4 and commencing charge of the battery 5 by supplying a charging current from the AC power source 1 through the AC-DC convertor 2, if the battery voltage is below a predetermined value. Thus the battery is progressively charged and when the battery voltage reaches a predetermined value, the detecting circuit 8 which is connected to the battery 5 through the contacts $c_2$ and $b_2$ actuates to supply a bias current to the base of the transistor 17, thereby rendering the transistor 17 conductive, making a circuit through the battery 5, the transistor 17, the resistor 18, the contacts $c_3$ and $b_3$ of the switch 16 and the transistor 9, rendering the transistor 7 non-conductive, deenergizing the relay coil 6 and turning off the relay switch 4. Then ends the charge of the battery 5.

Next, assuming that the switches 16a, 16b and 16c are positioned to connect the contacts $c_1$, $c_2$ and $c_3$ to the contacts $a_1$, $a_2$ and $a_3$, respectively, the load 3 is energized from the AC power source as described hereinbefore. Under this condition, if the AC power is interrupted, no DC current is supplied to the load 3 and the base current supplied to the transistor 9 through the diode 20 and the resistor 10 is also interrupted thereby rendering the transistor 9 non-conductive, interrupting the current through the battery 5, the resistor 19, the diode 12, and the transistor 9, making a current path through the battery 5, the resistor 19, the diode 13 and the base-emitter circuit of the transistor 14, rendering the transistor 14 conductive, permitting a current to flow through the battery 5, the transistor 7, the resistor 18, the contacts $c_3$ and $a_3$ and the transistor 14, rendering the transistor 7 conductive, energizing the relay coil 6 and turning on the relay switch 4. Then the load is supplied a DC current from the battery 5 through the relay switch 4 and the contacts $c_1$ and $a_1$. In this state, the battery is progressively discharged. If the battery voltage reduces below a predetermined value, the detecting circuit 8 which is connected to the battery through the contacts $c_2$ and $a_2$ actuates to supply the transistor 17 with a base current, thereby rendering the transistor 17 conductive, making a current path through the battery 5, the transistor 17, the resistor 18, the contacts $c_3$ and $a_3$, the transistor 14, rendering the transistor 7 non-conductive, deenergizing the relay coil 6 and turning off the relay switch 4. Then the battery stops supplying a DC current to the load, thereby protecting the same from overdischarge.

On the other hand, at the state that the load 3 is supplied with DC power from the battery 5, due to interruption of the AC power, through the relay switch 4 which is closed by energization of the relay coil 6, if the AC power is recovered, the transistor 9 becomes conductive by a base current thereto supplied through the resistor 10 thereby turning off the transistor 14, making a current path through the battery 5, the resistor 19, the diode 12 and the transistor 9, rendering the transistor 7 non-conductive, deenergizing the relay coil 6 and turning off the relay switch 4. Then the power supply to the load 3 is automatically changed to the AC power source through the AC-DC convertor 2.

As will be clear from the above description, according to the embodiment as shown in FIG. 1, the power supply to the load 3 is automatically changed from the AC power source to the battery or vice versa substantially without interrupting energization of the load and if the load is separated, the battery is automatically charged from the AC power source under control of the detecting circuit 8. Further, since provisions are made for preventing the battery from over-charge and over-discharge, the battery is not only safe from dangerous explosion, but also ensured a longer life resulting in economical maintenance.

Figure 2:
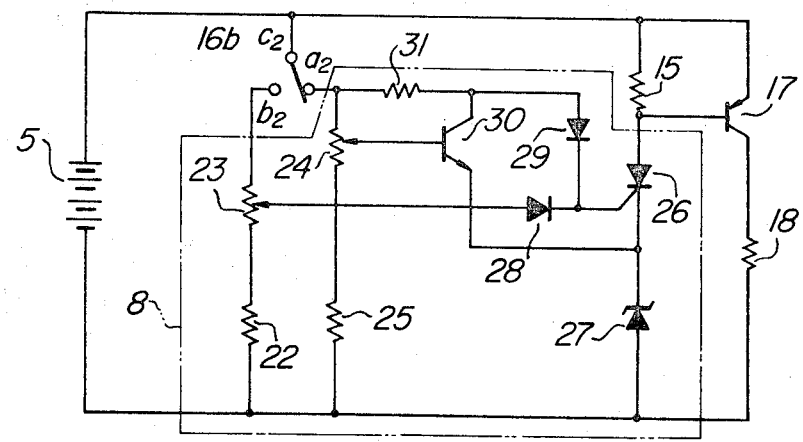
FIG. 2 shows a diagram of a detecting circuit for the detection of over-charge and over-discharge of the battery, which is an essential part of the embodiment in FIG. 1.

Now description will be made of the detecting circuit 8 which detects over-charge and over-discharge of the battery by monitoring the battery voltage. In FIG. 2 which shows an essential part relating to the detecting circuit 8 in FIG. 1, the positive and negative terminals of the battery 5 are connected across a first series circuit of a resistor 22 and a potentiometer 23 through the contacts $c_2$ and $b_2$ of the switch $16_b$ and also across a second series circuit of a resistor 25 and a potentiometer 24 through the contacts $c_2$ and $a_2$. When the switch 16b is positioned to connect the contact $c_2$ to the contact $b_2$ connected to the first series circuit, the detecting circuit 8 serves to detect the battery voltage exceeding the upper limit thereof, while when the switch 16b is positioned to connect the contact $c_2$ to the contact $a_2$ connected to the second series circuit, the detecting circuit 8 serves to detect the battery voltage reducing below the lower limit thereof. 26 is a switching element with a gate electrode such as a silicon controlled rectifier, of which the anode is connected to the positive terminal of the battery 5 through a resistor 15 and the cathode is connected to the cathode of a constant voltage diode 27, which has a reverse polarity from that of the silicon controlled rectifier 26. 28 is a diode of which the anode is connected to a sliding contact of the potentiometer 23, and the cathode is connected to the gate electrode of the silicon controlled rectifier 26. 29 is a diode of which the anode is connected directly to the collector of an NPN transistor 30 and through a resistor 31 to the contact $a_2$, while the cathode is connected to the gate electrode of the silicon controlled rectifier 26. The base of the transistor 30 is connected to a sliding contact of the potentiometer 24 and the emitter of the same is connected to the cathode of the silicon controlled rectifier 26. The voltage across the constant voltage diode 27 serves as a reference for the upper and lower limits of the battery voltage.

The operation of the circuit in FIG. 2 is as follows. First, assume that the switches 16a, 16b and 16c are positioned to make connections between the contacts $b_1$ and $c_1$, $b_2$ and $c_2$ and $b_3$ and $c_3$, respectively. The relay switch 4 is closed, as mentioned with reference to FIG. 1, and the battery is gradually charged thereby increasing the battery voltage. As a result, the voltage at the sliding contact of the potentiometer 23 is also increased gradually. As the voltage at the sliding contact exceeds the breakdown voltage of the constant voltage diode 27, the silicon controlled rectifier 26 is triggered by a gate current supplied from the sliding contact of the potentiometer 23 through the diode 28, the gate and the cathode of the silicon controlled rectifier 26 and the constant voltage diode 27, thereby permitting a current flow through the resistor 15, the silicon controlled rectifier 26 and the constant voltage diode 27.

Figure 3:
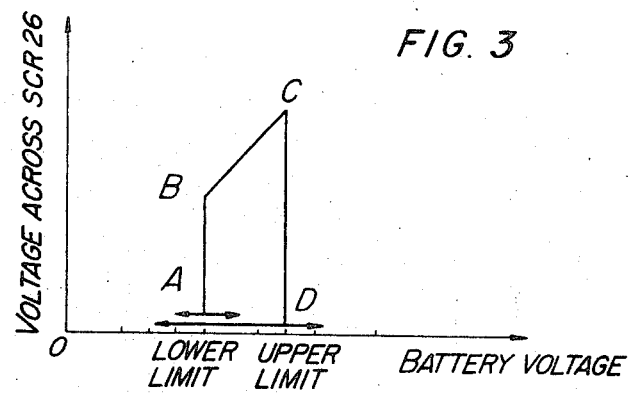
FIGS. 3 and 4 are characteristic curves of the circuits shown in FIGS. 1 and 2, respectively.

The voltage across the anode and cathode of the silicon controlled rectifier 26 varies along the line A, B, C and D in FIG. 3 with variation of the charging voltage, i.e. the voltage across the electrodes of the battery 5. Once the charging voltage exceeds the upper limit of the battery voltage, the silicon controlled rectifier 26 remains conductive as long as a current larger than its holding current is supplied through the resistor 15 and the constant voltage diode 27.

Next, assume that the switches 16a, 16b and 16c are positioned to make connections between the contacts $a_1$ and $c_1$, $a_2$ and $c_2$, and $a_3$ and $c_3$, respectively. When the battery voltage is higher than the lower limit thereof, the sliding contact of the potentiometer 24 produces a voltage higher than the breakdown voltage of the constant voltage diode 27, whereby the transistor 30 is rendered conductive by a base current supplied thereto from the sliding contact of the potentiometer 24 through the base-emitter of the transistor 30 and the constant voltage diode 27. Hence, the gate and the cathode of the silicon controlled rectifier 26 is short-circuited through the transistor 30. If the battery voltage decreases below the lower limit thereof, the voltage at the sliding contact of the potentiometer 24 becomes lower than the breakdown voltage of the constant voltage diode 27, thereby rendering the transistor 30 non-conductive, supplying a current to the gate of the silicon controlled rectifier 26 through the diode 29, and rendering the silicon controlled rectifier 26 conductive. As this state, the voltage across the anode and cathode of the silicon controlled rectifier 26 varies along the line D, C, B and A in FIG. 3 with variation of the battery voltage. Once the silicon controlled rectifier 26 is rendered conductive thereby permitting a current flow therethrough, the current flow continues even if the battery voltage is recovered to a value exceeding the lower limit due to for example, interrupting of power supply to the load as far as the series circuit of the resistor 15, the silicon controlled rectifier 26 and the constant voltage diode 27 is connected to the battery.

Thus, the transistor 17 is rendered conductive due to over-charge or over-discharge of the battery 5 thereby increasing the voltage drop across the resistor 15 and rendering the transistor 17 conductive.

Practically, the current carried through the silicon controlled rectifier 26 is determined as being slightly larger than a holding current for retaining the same conductive so as to reduce waste of energy of the battery to a level as small as possible.

Figure 4:
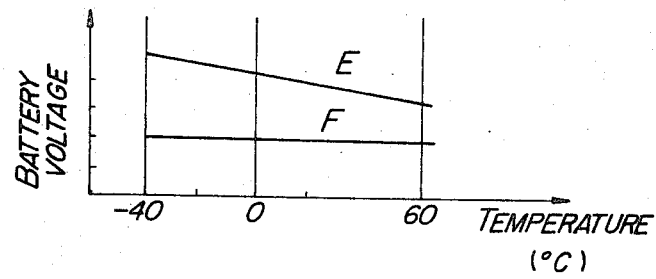

Now description will be made of the temperature characteristic of the circuit as shown in FIG. 2. When the detecting circuit 8 is operating to detect over-charge of the battery 5, the temperature characteristics of the diode 28, through which the gate current is supplied to the silicon controlled rectifier 26, serves to compensate the upper limit of the battery voltage in accordance with increasing of the ambient temperature. With increasing of the ambient temperature, the forward voltage drop of the diode 28 and the trigger voltage of the silicon controlled rectifier decreases and hence, the upper limit if the battery voltage, where the silicon controlled rectifier becomes conductive, decreases along the line E in FIG. 4. The gradient of the curve E is adjustable by employing a suitable number of diodes 28.

In the case of detection of over-discharge, the series circuit of the diode 29 and the gate-cathode circuit of the silicon controlled rectifier 26 is connected in parallel to the collector-emitter circuit of the transistor 30 and hence, the temperature characteristics of both the parallel circuits serve to substantially cancel variation of the operating characteristics in each other due to variation of the ambient temperature. Therefore, by employing a constant voltage diode having operating characteristics substantially independent of temperature variation, the lower limit of the battery voltage is maintained substantially constant, as shown by a curve F in FIG. 4, within a reasonable temperature range.

What is claimed is:

1. A power supply apparatus comprising:
rectifier means for converting AC power to DC power and having an input terminal adapted to be connected to an AC power source for receiving said AC power and an output terminal to be connected to a load through a first switch for supplying said DC power thereto;
a DC input terminal adapted to be connected to a rechargeable battery;
relay means including a relay switch comprising a pair of spaced contacts and an armature for bridging said contacts connected between said output terminal of said rectifier means and said DC input terminal and a relay coil for actuating the armature of said relay switch;
an AC detecting circuit having a first output terminal for producing a detecting signal upon detection of the absence of said AC power and a second output terminal for producing said detecting signal upon detection of the presence of said AC power;
a driving circuit for energizing said relay coil responsive to said detecting signal, said driving circuit being supplied continuously with power by said battery; and
switch means including said first switch and a second switch connected between said driving circuit and said AC detecting circuit, said switch means changeable between a first position where said first switch is closed and said second switch connects said driving circuit to said first output terminal and a second position where said first switch is open and said second switch connects said driving circuit to said second terminal.

2. A power supply apparatus according to claim 1, wherein said AC detecting circuit comprises a circuit for rectifying said AC power and producing a smoothed DC output, a first transistor having a base applied with said smoothed DC output and an emitter connected to the ground potential, a second transistor having a base and an emitter connected to the collector and emitter of said first transistor, respectively, resistor means connected between said DC input terminal and the connecting point of said collector of said first transistor and said base of said second transistor for receiving DC power from said battery, and said first and second output terminals being connected to said collectors of said second and first transistors.

3. A power supply apparatus according to claim 1, further comprising an over-charge and over-discharge detecting circuit for producing a detecting signal upon detection of over-charge and over-discharge of said battery, said driving circuit being controlled responsive to said last-mentioned detecting signal and the first-mentioned detecting signal produce by said AC detecting circuit.

4. A power supply apparatus according to claim 2, further comprising an over-charged and over-discharge detecting circuit for producing a detecting signal upon detection of over-charge and over-discharge of said battery, wherein said driving circuit includes a switching element connected to said first and second output terminals through said second switch for receiving said last-mentioned detecting signal, said switching element producing a signal for energizing said relay coil upon receiving said last-mentioned detecting signal.

5. A power supply apparatus according to claim 3, wherein said over-charge and over-discharge detecting circuit comprises a first circuit including a first potentiometer having a first sliding contact, a second circuit including a second potentiometer having a second sliding contact, a third circuit connected to said DC input terminal and including a switching element having a gate electrode and a constant voltage diode connected in series and in reverse polarity to said switching element, said gate electrode being connected to said first sliding contact through a diode, and a transistor having a collector-emitter circuit connected across said gate electrode and one of main electrodes of said switching element, and wherein said switching means further comprises a third switch having a first switch contact connected between said first circuit and said DC input terminal and second switch contact connected between said second circuit and said DC input terminal, said third switch being operative to close said first switch contact at the second position of said switching means and to close said second switch contact at the first position of said switching means.

* * * * *